United States Patent

[11] 3,612,030

[72] Inventor Philip Blum
    Lexington, Mass.
[21] Appl. No. 857,241
[22] Filed Sept. 11, 1969
[45] Patented Oct. 12, 1971
[73] Assignee National Research Corporation
    Cambridge, Mass.
    Continuation-in-part of application Ser. No.
    611,414, Jan. 24, 1967, now abandoned.

[54] ROCK SAMPLING
    10 Claims, 9 Drawing Figs.
[52] U.S. Cl. .................................................... 125/1,
    125/3, 299/86, 51/283
[51] Int. Cl. ...................................................... B28d 1/00
[50] Field of Search ........................................... 175/58,
    308; 51/283, 147; 299/86; 125/3–5, 1

[56] References Cited
    UNITED STATES PATENTS
    1,496,522  6/1924  Canning ...................... 125/3 UX
    1,580,155  4/1926  Niestradt ..................... 125/4
    2,718,732  9/1955  Comstock .................... 51/47
    3,123,157  3/1964  Graham ....................... 175/58
    3,374,034  3/1968  Conner ........................ 299/86

Primary Examiner—Harold D. Whitehead
Attorneys—Kenneth W. Brown, Arthur S. Collins, Barry R.
    Blaker and Lawrence A. Chaletsky ABSTRACT: A method for sampling rock and other brittle materials and for controlling resultant particle sizes is described. The method involves cutting grooves in the rock surface to provide a grouping of parallel ridges and subsequently machining the ridges to provide a powder specimen. The machining step may comprise milling, drilling, lathe cutting or the like; but a planing step is advantageous. Control of the particle size distribution is effected primarily by changing the height and width of these ridges. This control exceeds that obtainable by conventional grinding.

PATENTED OCT 12 1971 3,612,030

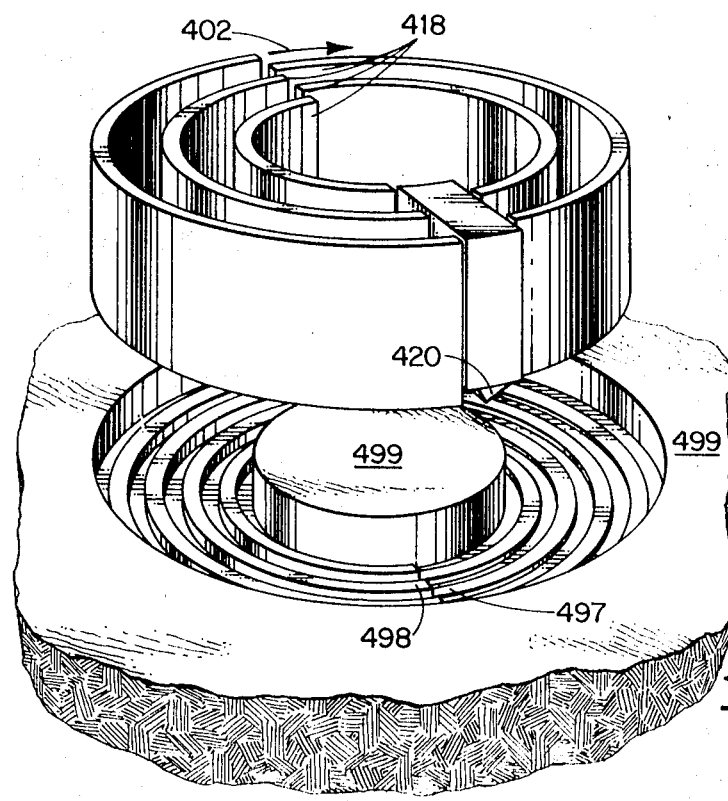
Fig. 4.
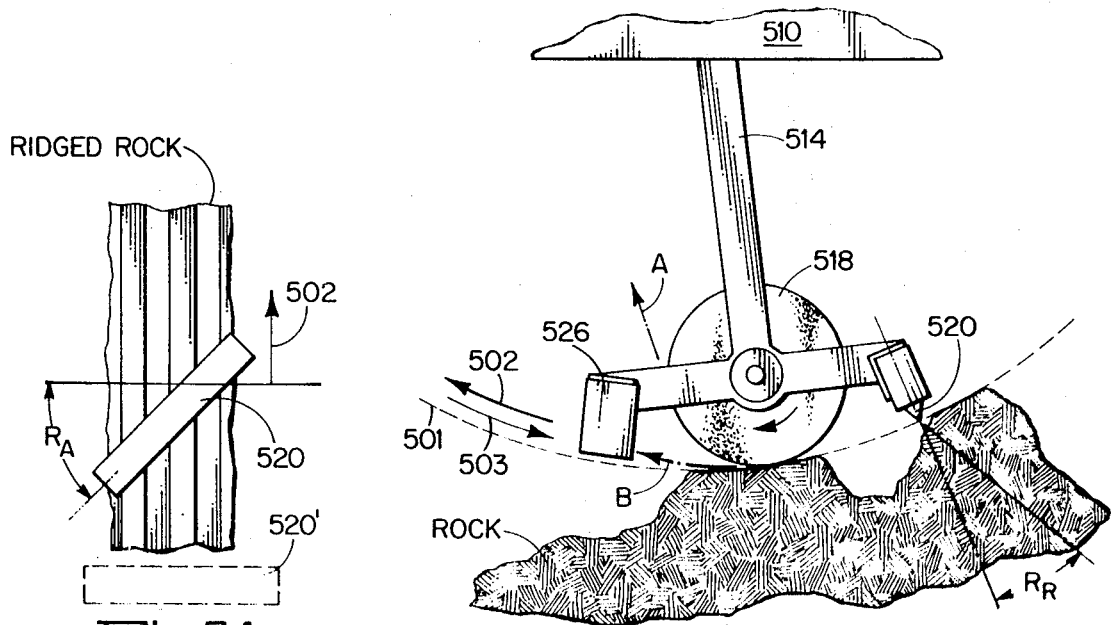
Fig. 5A.
Fig. 5.

ROCK SAMPLING

This application is a continuation-in-part of Ser. No. 611,414 filed Jan. 24, 1967 and now abandoned. An additional related application is Ser. No. 768,942 filed Aug. 6, 1968, a division of said Ser. No. 611,414.

The invention described herein was made in the performance of work under a NASA contract and is subject to the provisions of the National Aeronautics and Space Act of 1958, Public Law 85—568 (72 Stat. 426; 42 U.S.C. 2451) as amended. A license has been granted to the United States Government for practice of the invention and title to the invention and this patent has been reserved to the assignee, subject to voidability by NASA.

There is a need in geological sampling for an apparatus which will abrade a rock surface and give high yields in particular particle size ranges without requiring subsequent classification or sieving techniques. An important reason is that minerals ordinarily fragment into unique size distributions and classification may therefore alter their representation in the powder specimens.

It has been discovered that known grinding techniques do not afford adequate particle yields between 75 and 150 microns, a range suitable for analysis by a petrographic microscope. Conventional grinding, e.g., of basalt, tends to produce fine particles with sizes predominantly below 44 microns. Variation of conventional grinding parameters such as wheel speed and grit size does little to increase the yield above this range or to change the shape of the size distribution curve.

The present invention gives a two-step treatment to rock or other brittle material. This consists in cutting a series of adjacent grooves on the surface of the brittle material to form a grouping of parallel ridges. The ridges are subsequently machined by a toothed machining process, preferably by planing. Control over particle size distribution is effected by altering the thickness and height of these ridges, as well as by altering machining parameters, such as depth of cut, degree of tooth sharpness, axial and radial rake, wheel speed and traverse speed.

The use of the invention is now described with reference to the accompanying drawings wherein:

FIGS. 4 and 5 are sketches of other embodiments of the apparatus; and

FIG. 5A is a plan view of a ridged surface being machined by a tooth cutter and indicating axial rake angle.

Figure 1:
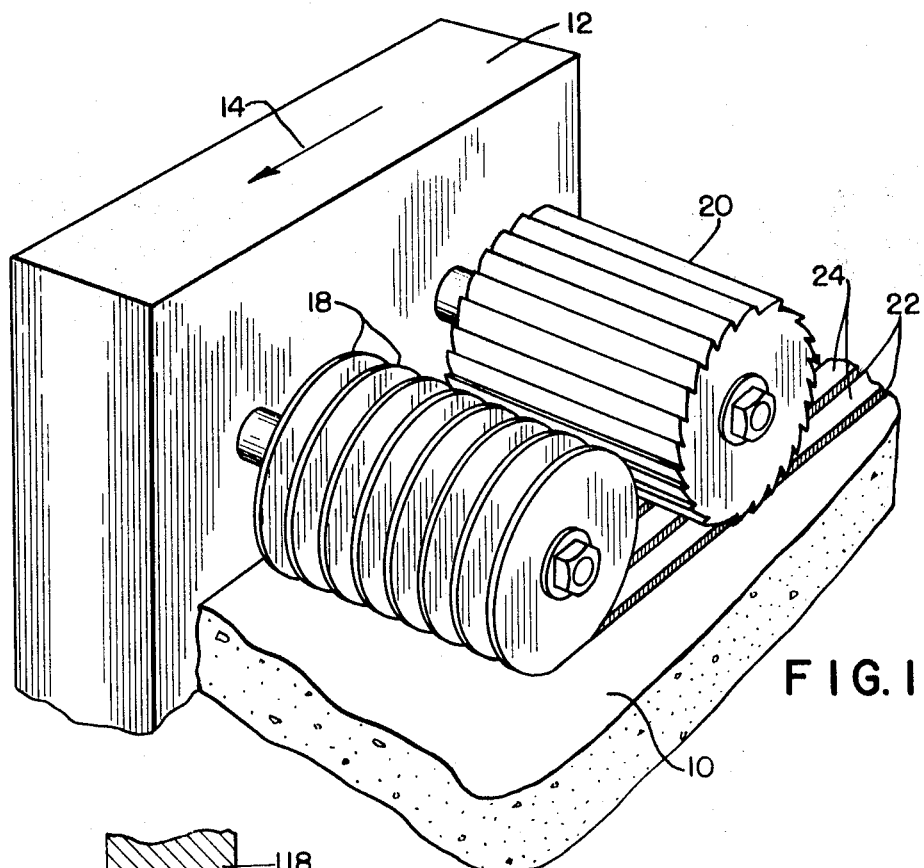
FIG. 1 is a schematic sketch of an improved sampling apparatus.

Referring to FIG. 1 there is shown a rock 10 to be sampled, a tool carriage 12 traversing in the path and direction indicated by the arrow 14. Mounted on the carriage are a group of thin diamond grinding wheels 18 and a milling cutter 20 with wedge-shaped teeth. The wheels 18 and miller 20 are driven by a motor (not shown) mounted in the carriage 12. The wheels 18 cut closely spaced parallel grooves 22 thus forming ridges 24. The milling cutter cuts the ridges down partially (but not fully) to produce a more controllable yield in terms of particle size. Only the milled powder is collected. A collection cup (not shown) is mounted on the apparatus for this purpose.

Figure 1A:
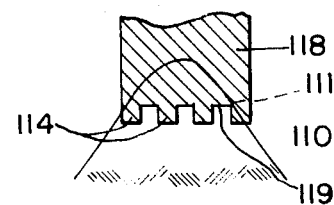
FIG. 1A is a diagram showing a variation of the ridge cutter and FIGS. 1B and 1C show other variations of the apparatus.

FIG. 1A shows a variation of the apparatus in which a single wheel with several parallel lands 114 is used instead of several grinding wheels. It should be noted that here the rock sample 110 has a narrow profile. The profile should preferably be preground (by the wheel 118 with abrasive on the flats 119 or a separate grinder) to the level 111 to provide a common level for groove and ridge formation.

Figure 1B:
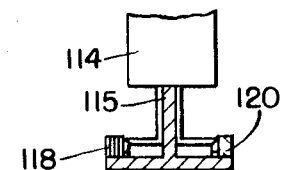

FIG. 1B shows a variation of the apparatus formed as a rock drill for taking a sample in a predrilled hole. A wheel 118 (similar to the wheel 118 of FIG. 1A) and a milling cutter 120 are mounted on a common shaft 115. They are driven from support 114 for traversing on the same rotary path and they are individually rotated by gears 130.

Figure 1C:
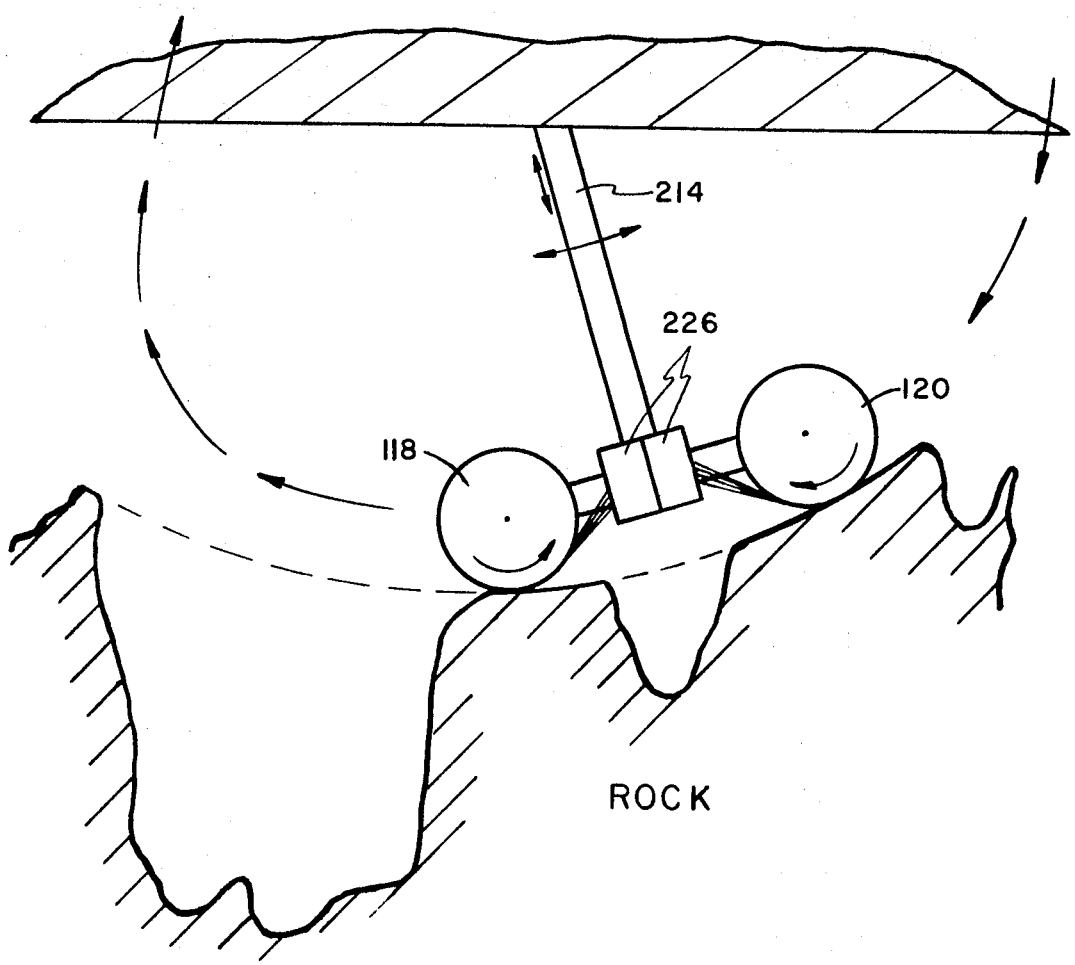

FIG. 1C shows another version of the apparatus on a pendulum mount with cutoff wheels 118 and a milling cutter 120 and collection boxes 226. The wheels 118 and 120 again travel the same path and same direction. The wheel drive transmission is not shown.

The pendulum continually swings around with the cutoff wheel 118 lowering the rock contour until a suitable level is obtained. Then the milling cutter collects a sample for use in analytical processes.

Figure 2:
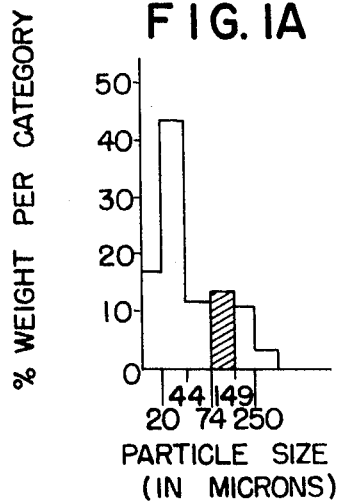
FIG. 2 is a bar graph showing size distribution of rock particles obtained using prior art grinding techniques.

FIG. 2 is a bar graph showing the highest yield of particles in and about the 74—149-micron range obtained by conventional grinding of basalt. (The particle sizes indicated on the abscissa between 0 and ∞ are the sieve sizes used.) The distribution shown was obtained by traversing the rock at 12 inches per minute, using a 16-grit diamond wheel run at 440 revolutions per minute, and taking off 0.005 inch of rock per traverse.

Figure 3:
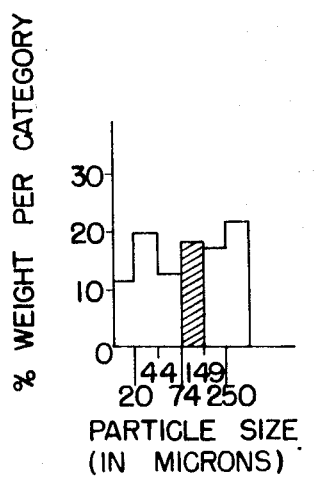
FIG. 3 is a bar graph showing the improved distribution obtained in one example of use of the present invention.

FIG. 3 shows the improved sample distribution obtained from the same rock using the method of the present invention. Besides the improvement in immediate range of interest, which is shown shaded, here is a sizable increase in the adjacent 149—250-micron range and a marked reduction in the under 44-micron range. Further peaking of the distribution about the desired 74—149-micron range can be obtained with further adjustment of ridge widths and heights as described below. The results shown in FIG. 3 were obtained using the following conditions: The previously described grooves were cut with a 60-mil width and 35-mil depth producing intervening ridges of 15-mil width and 35-mil height. The prepared surface was traversed by a flat tooth milling cutter rotating at 440 revolutions per minute and traversing at 30 inches per minute. The milling cutter took 0.008 inch off the ridges per traverse.

The reasons for the size control using the present invention are the following: The production of grooves removes considerable support from the remaining ridge material. As a result a reduction is effected in the amount of mechanical crushing pressure required to remove the ridge material. Fewer fines are thereby produced because the amount of material whose cohesive force exceeds the disruptive comminution force increases. For this reason, within limits, the thinner the ridges, the fewer the number of resultant fines. Imposition of an upper particle size limit is also assisted. The latter results from limiting particle size in one dimension, that provided by the ridge width. Advantageous results have been obtained with ridge widths many times greater than the desired particle size but optimal results should occur with ridge width approximately equal to the desired size. Ridge height should be greater than the particle size desired, optimally about double. However, advantageous results have been obtained with heights many times larger. Depth of cut should be less than the ridge height and, optimally, about equal to the desired particle size.

The toothed-machining should utilize an axial rake angle greater than 0°. The radial rake angle should preferably be negative for planing and positive for milling. The edge of the cutting tooth should be dull rather than sharp. It was found desirable to run a fine-grit diamond wheel over a tungsten carbide tooth to wear away its freshly sharpened edge.

In the preliminary grinding to produce ridges, avoidance of heat was found desirable to avoid simultaneous ridge fracture. For quickest ridge production compatible with minimal fracture, a 7-inch wheel using 120-grit diamond abrasive with a medium strength bond was run at 400 revolutions per minute. Equivalent surface feet per minute should be utilized in other wheel sizes. Traverse rates must also be low, about 0.5 inch per minute. These conditions worked well with diverse rock compositions.

FIG. 4 shows a drill form of rock-sampling apparatus using a planing tool. The ridges are produced by cutting grooves with alternately placed semicircular core drills 418. This arrangement avoids problems of ridge pinching which attend use of completely circular concentric core drills. The groove cutters are followed up by a planing tool 420. The drill assembly moves in the rotary direction 402 for grinding and scraping. Gas pressure is used to separately flush out undesired groove cuttings and desired ridge scrapings. Unground rock surface is indicated at 499, a ridge before scraping is shown at 498 and a residual ridge after scraping is shown at 497.

FIG. 5 shows another apparatus for ridge cutting and machining using a planing-type maching tool. A shaft 514 is supported from a carrier 510 (e.g. a spacecraft) and has mounted at its end a ganged set of grinding wheels 518 and a planing tool 520. The tools 518, 520 are moved along a circular traverse path 501 initially in direction 502 for cutting and then in direction 503 for retrace and powder collection. Also included in the apparatus is a collection box 526.

The shaft 514 is adjustable to act as an adjustable radius of the circular path 501 to ensure tangential contact with rock to be sampled and permitting hunting for solid rock, removal of overlying powder and finally sampling of powder in accordance with the present method and delivery to the spacecraft.

The edge of scraper 520 is located on an arc radius smaller than that of the grinding wheels 518. Changes in radius of arc 501 determine total ridge height and depth planed (scraped) per pass while the differential radius between 520 and 518 determines residual ridge height after planing, which is invariant with the number of passes.

Acquisition of rock samples is independent of rock contour and repetitive. Prelevelling of rock surface is not necessary.

Moving in direction 502, the apparatus cuts grooves and planes to produce powder which is thrown down on the ridged rock surface and into the trenches due to the negative radial rake angle $R_R$ of tool 520. On the return pass, moving in direction 503, the grinding wheels tend to throw the powder in a shallow direction indicated by arrow B into box 526. On the next cutting pass, however, new trench cuttings tend to be thrown as shown in arrow A and avoid collection.

FIG. 5A indicates a 45° axial rake angle for tool 520 (as opposed to the zero rake angle of 520' shown in dashed lines as an alternative configuration).

Selected results of sampling experiments are tabulated in table I below. The results indicate the improvement in reduction of fines and in better distribution obtained through the present invention compared to conventional grinding. The results also show the distinctly advantageous character of the planing species over the milling species.

TABLE I

| | | Variables | | | | | Powder weight distribution (percent per micron sieve interval) | | | | | | | |
|---|---|---|---|---|---|---|---|---|---|---|---|---|---|---|
| | | | Ridge size [3] | | Depth of cut [3] | | | | | | | | | |
| AM [1] | Rock [2] | Axial rake,° | Wd. | Ht. | Per pass | Total | CE [4], percent | 0–20 | 20–44 | 44–74 | 74–149 | 149–250 | 250–420 | 420–841 | 841–∞ |
| I | | | | | | | | 29 | | 15 | 50 | 10 | 5 | | |
| II | B | 45 | 8 | 8 [5] | <3.5 [5] | <7.0 | 30 | 9 | 20 | 19 | 37 | 14 | 1 | 1 | 1 |
| II | B | 0 | 8 | 8 | 4.5 | 4.5 | 72 | 13 | 20 | 14 | 30 | 20 | 2 | 1 | 1 |
| II | B | 45 | 8 | 8 | 4.5 | 4.5 | 80 | 15 | 18 | 10 | 19 | 27 | 6 | 3 | 2 |
| II | O | 45 | 8 | 8 | 4.5 | 4.5 | 79 | 4 | 17 | 13 | 23 | 27 | 13 | 2 | 1 |
| III | B | 0 | 10 | 45 | 10.0 | 20.0 | 85 | 8 | 18 | 10 | 17 | 22 | 4 | | 0 |
| IV | B | | | | 5.0 | 5.0 | 99 | 17 | 41 | 12 | 14 | 11 | 3 | | |

[1] Abrasion Method (AM):
 I—Desired distribution
 II—Planning
 III—Milling
 IV—Conventional grinding.
[2] B = Basalt; O = Obsidian.
[3] In mils.
[4] Collection Efficiency (CE).
[5] Some cutter flexure.

Several variations can be made from the above-described embodiments. It is therefore intended that the above disclosure shall be read as illustrative and not in a limiting sense.

I claim:

1. Method of producing a sample of brittle material with controlled particle size comprising the steps of grinding parallel grooves in a surface of the brittle material to form intervening parallel ridges and subsequently machining these ridges with a toothed cutter to remove portions of the ridges whereby more particles of the desired size are obtainable than by conventional grinding alone.

2. The method of claim 1 wherein the ridges are produced in a width about equal to the desired average particle diameter.

3. The method of claim 1 wherein the tooth machining step is carried out as a planing type of cutting.

4. The method of claim 1 wherein the tooth machining step is carried out as a rotary type of cutting.

5. The method of claim 1 wherein the depth of tooth cut is about equal to the desired particle size.

6. The method of claim 1 wherein the toothed cut is carried out at a negative radial rake angle and the machining step is carried out as a planing type of cutting.

7. The method of claim 1 wherein adjacent ridges to be cut are produced in sequence rather than simultaneously.

8. The method of claim 1 wherein the grinding means are retraced over a machined region to move powder for collection purposes.

9. The method of claim 1 further comprising traversing the groove cutting and machining means in tandem using a common drive.

10. The method of claim 9 further comprising supporting the groove cutting and machining means on a common radial mount and adjusting the mount in radial length to hunt the surface of the brittle material.